US010419307B2

United States Patent
Besehanic

(10) Patent No.: US 10,419,307 B2
(45) Date of Patent: Sep. 17, 2019

(54) METHODS AND APPARATUS TO COORDINATE RECEIPT OF MONITORING INFORMATION

(71) Applicant: The Nielsen Company (US), LLC, New York, NY (US)

(72) Inventor: Jan Besehanic, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 681 days.

(21) Appl. No.: 14/983,044

(22) Filed: Dec. 29, 2015

(65) Prior Publication Data

US 2016/0359702 A1  Dec. 8, 2016

Related U.S. Application Data

(60) Provisional application No. 62/155,266, filed on Apr. 30, 2015.

(51) Int. Cl.
*H04L 12/26* (2006.01)
*H04L 29/08* (2006.01)
*G06Q 30/02* (2012.01)

(52) U.S. Cl.
CPC ......... *H04L 43/06* (2013.01); *G06Q 30/0242* (2013.01); *H04L 67/1002* (2013.01); *H04L 67/22* (2013.01)

(58) Field of Classification Search
USPC ......................... 709/203, 223–224, 227–229
See application file for complete search history.

(56) References Cited

U.S. PATENT DOCUMENTS

| | | | | |
|---|---|---|---|---|
| 7,197,547 B1* | 3/2007 | Miller | ................. | G06F 16/9574 709/223 |
| 2002/0054587 A1* | 5/2002 | Baker | ................. | G06F 11/0709 370/352 |
| 2003/0055883 A1* | 3/2003 | Wiles, Jr. | ............ | G06F 11/3414 709/203 |
| 2005/0038905 A1* | 2/2005 | Banes | ..................... | H04L 29/06 709/238 |
| 2013/0268617 A1* | 10/2013 | Erickson | ................. | H04L 29/06 709/213 |

\* cited by examiner

*Primary Examiner* — Younes Naji
*Assistant Examiner* — Da T Ton
(74) *Attorney, Agent, or Firm* — Hanley, Flight & Zimmerman, LLC

(57) ABSTRACT

Methods, apparatus, systems and articles of manufacture to coordinate receipt of monitoring information are disclosed. An example method includes in response to a first received message requesting a session identifier, creating, with a first processing device, the session identifier. The session identifier including an identifier of the first processor. The first message is received from a media device via a load balancer. First monitoring information is extracted from the first message. The first monitoring information is stored in a first database of the first processor.

15 Claims, 9 Drawing Sheets

METHODS AND APPARATUS TO COORDINATE RECEIPT OF MONITORING INFORMATION

FIELD OF THE DISCLOSURE

This disclosure relates generally to receiving monitoring information, and, more particularly, to methods and apparatus to coordinate receipt of monitoring information.

BACKGROUND

Media providers and/or other entities such as, for example, advertising companies, broadcast networks, etc. are often interested in the viewing, listening, and/or media behavior of audience members and/or the public in general. The media usage and/or exposure habits of audience members as well as demographic data about the audience members are collected and used to statistically determine the size and demographics of an audience of interest.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
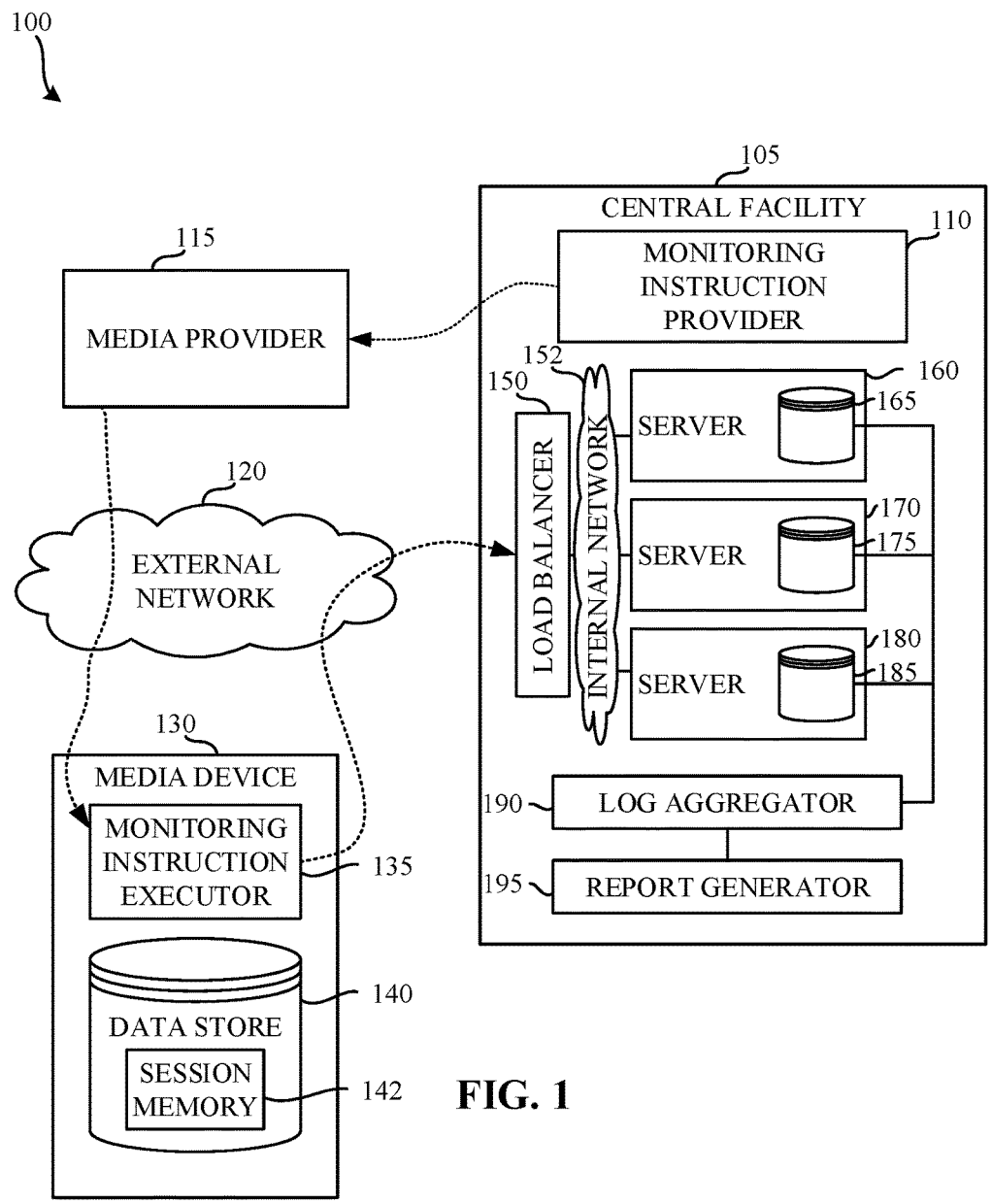
FIG. 1 is a block diagram of an example environment of use including an example central facility to coordinate receipt of monitoring information in accordance with the teachings of this disclosure.

Monitoring companies desire knowledge on how users interact with media devices such as smartphones, tablets, laptops, smart televisions, etc. In particular, media monitoring companies want to monitor media presentations made at the media devices to, among other things, monitor exposure to advertisements, determine advertisement effectiveness, determine user behavior, identify purchasing behavior associated with various demographics, etc. To facilitate monitoring the media presentations made at the media devices, the media devices are instructed to report monitoring information to the monitoring company.

As used herein, the term "media" includes any type of content and/or advertisement delivered via any type of distribution medium. Thus, media includes television programming or advertisements, radio programming or advertisements, movies, web sites, streaming media, etc. Example methods, apparatus, and articles of manufacture disclosed herein facilitate coordination of receipt of monitoring information concerning media presentations at media devices. Such media devices may include, for example, Internet-enabled televisions, personal computers, Internet-enabled mobile handsets (e.g., a smartphone), video game consoles (e.g., Xbox®, PlayStation® 3), tablet computers (e.g., an iPad®), digital media players (e.g., AppleTV®, a Roku® media player, a Slingbox®, etc.), etc. In some examples, monitoring information is aggregated to determine ownership and/or usage statistics of media devices, relative rankings of usage and/or ownership of media devices, types of uses of media devices (e.g., whether a device is used for browsing the Internet, streaming media from the Internet, etc.), and/or other types of media device information. In examples disclosed herein, monitoring information includes, but is not limited to, media identifying information (e.g., media-identifying metadata, codes, signatures, watermarks, and/or other information that may be used to identify presented media), application usage information (e.g., an identifier of an application, a time and/or duration of use of the application, a rating of the application, etc.), and/or device and/or user-identifying information (e.g., a username, a media access control (MAC) address, an Internet Protocol (IP) address, an Apple ID, a panelist identifier, etc.).

Media devices such as tablet computers (e.g., an Apple iPad®, an Asus Transformer™, etc.) present media using applications (sometimes referred to as "apps") that access, retrieve, request, and/or present media (e.g., Internet media). In some examples, media devices use a browser to access, retrieve, request, and/or present media. Many different "apps" exist and can be downloaded by users through app stores such as, for example, Apple iTunes®, Google Play®, etc. Hundreds, if not thousands, of apps are available in the app stores that enable presentation of media. Moreover, thousands, if not millions, of different websites and/or Internet media sites may be presented by the media device. In some examples, "apps" can be downloaded and/or installed from a location other than an app store such as, for example, a website, a memory device (e.g., an SD card, a CD-ROM, etc.). Examples of such applications include, but are not limited to, Hulu®, Netflix®, HBO Go®, etc. In some examples, an "app" may be a web application that is executed by a browser of the media device. In examples disclosed herein, the "apps" are implemented with monitoring instructions that cause the media device to report monitoring information to a central facility of the monitoring company.

When reporting monitoring information to the central facility, the media device uses a session ID. The session ID used to represent a monitored session of media presentation activity at the media device. For example, a first session ID may correspond to a first period of time where a user was interacting with the media device. During that first usage period, monitoring information is reported to the central facility by the media device using the first session ID. If, for example, the user stopped using the media device for a threshold period of time (e.g., ten minutes, fifteen minutes, thirty minutes, etc.) and later resumed use of the media device, a second session ID would be issued corresponding to the second usage period, and would be used when reporting monitoring information for the second usage period.

In examples disclosed herein, monitoring information is received at a server of a central facility. The server collects and stores the monitoring information and creates session IDs to be used by the media device(s) that are reporting monitoring information. However, using a single server to receive monitoring information can result in processing delays of the monitoring information and/or timeouts of attempts to transmit monitoring information from the media device. If an attempt to transmit monitoring information were to time out, it is possible that the monitoring entity might not receive some or all of the monitoring information transmitted by the media device, thereby causing errors and/or unreliability in subsequent reports created based on the received monitoring information. In examples disclosed herein, multiple servers are operated at the central facility to receive monitoring information from the media device(s). In examples disclosed herein, messages including monitoring information are first passed through a load balancer that distributes monitoring messages to one of the multiple servers at the central facility.

In some examples, the media device may send multiple messages including monitoring information corresponding to a single session. Using the load balancer, such multiple messages might not be transmitted to the same server. As such, if the server that receives the monitoring information is not the server that originated the session ID, the receiving server will not be able to determine whether the session has timed out (e.g., a threshold amount of time has passed since the last activity associated with that session). In examples disclosed herein, when generating the session ID, the server includes a server identifier. The server identifier enables a subsequent different server that receives monitoring information from the media device to determine which server originated the session ID and contact the server originating the session ID to determine if the session should be timed out.

FIG. 1 is a block diagram of an example environment of use 100 including an example central facility 105 to coordinate receipt of monitoring information in accordance with the teachings of this disclosure. A monitoring instruction provider 110 of the central facility 110 provides monitoring instructions to a media provider 115. The media provider 115 implements the monitoring instructions in, for example, a web site, an "app," etc. The monitoring instructions are provided to the media device 130 via the external network 120. The example media device includes a monitoring instruction executor 135 to execute the monitoring instructions. The monitoring instruction executor 135 communicates with the central facility 105 to report monitoring information. While a single media device 130 is shown in the illustrated example of FIG. 1, in normal use, many media devices 130 (e.g., hundreds of media devices, thousands of media devices, etc.) will report monitoring information to the central facility 105. In examples disclosed herein, the example monitoring instruction executor 135 locally stores a session ID provided by the central facility in a session memory 140 of the media device 130. The example central facility 105 includes a load balancer 150, an internal network 152, servers 160, 170, 180, a log aggregator 190, and a report generator 195. Each of the servers 160, 170, 180 includes a corresponding session database 165, 175, 185.

As noted above, the example central facility 105 of the illustrated example of FIG. 1 includes the monitoring instruction provider 110, the load balancer 150, the internal network 152, the servers 160, 170, 180, the log aggregator 190, and the report generator 195. In examples disclosed herein, the example central facility 105 is operated by an audience measurement entity such as, for example, The Nielsen Company (US), LLC. In the illustrated example of FIG. 1, a single central facility 105 is shown. However, in some examples, multiple central facilities may be used to collect monitoring information from media device(s) 130. For example, a first central facility may be located in a first geographic region (e.g., the eastern coast of the United States of America) and a second central facility may be located in a second geographic region different from the first central facility (e.g., the western coast of the United States of America). The example log aggregator 190 of one of the central facilities may collect monitoring information from the other central facility(ies) to prepare an aggregated monitoring report.

The example monitoring instruction provider 110 of the illustrated example of FIG. 1 provides instructions to an application developer(s) of the media provider 115 to facilitate creation of web pages and/or "apps" that include the monitoring instructions. In examples disclosed herein, the monitoring instructions are provided as part of a software development kit (SDK). In some examples, the SDK is provided such that the application developer(s) can integrate the SDK into existing applications. While in the illustrated example an SDK is provided, monitoring instructions provided via the SDK may be provided in any other fashion. For example, the monitoring components may be provided as an application programming interface (API), a plugin, an add-on, etc. An example approach to providing monitoring instructions to the media provider 115 such that they are ultimately executed by a media device 130 is disclosed in U.S. patent application Ser. No. 13/828,971, which is hereby incorporated by reference in its entirety.

The example monitoring instruction provider 110 provides monitoring instructions to the media provider 115. The example media provider 115 of the illustrated example of FIG. 1 includes one or more servers providing Internet media (e.g., web pages, audio, video, images, etc.). The example media provider 115 of FIG. 1 may be implemented by any provider(s) of media such as a digital media broadcaster, multicaster, or unicaster (e.g., a cable television service, a fiber-optic television service, an IPTV provider, etc.) and/or an on-demand digital media provider (e.g., an Internet streaming video and/or audio services such as Netflix®, YouTube®, Hulu®, Pandora®, Last.fm®, etc.), a web page, and/or any other provider of media. Additionally or alternatively, the example media provider 115 may not be an Internet provider. For example, the media providers may be on a private, a virtual private, and/or semi-private network (e.g., a LAN). The example media provider 115 instruments the monitoring instructions such that they are executed by the media device 130 when presenting media. In examples disclosed herein, the example monitoring instructions may be instrumented in, for example, a webpage (e.g., as Javascript instructions, etc.), an instrumented application, etc. The monitoring instructions and/or the media are provided to the media device 130 via the external network 120.

The example external network 120 of the illustrated example of FIG. 1 is a wide area network (WAN) such as the Internet. However, in some examples, local networks may additionally or alternatively be used. For example, multiple networks (e.g., a cellular network, an Ethernet network, etc.) may be utilized to implement the example external network 120 of FIG. 1.

The example media device 130 of the illustrated example shown in FIG. 1 is a device that retrieves media from the media provider 110 for presentation. In some examples, the media device 130 is capable of directly presenting media (e.g., via a display) while, in other examples, the media device 130 presents the media on separate media presentation equipment (e.g., speakers, a display, etc.). Thus, as used herein "media devices" may or may not be able to present media without assistance from a second device. Media devices are typically consumer electronics. For example, the media device 130 of the illustrated example is a tablet such as an Apple iPad™, and thus, is capable of directly presenting media (e.g., via an integrated display and speakers). While in the illustrated example, a tablet is shown, any other type(s) and/or number(s) of media device(s) may additionally or alternatively be used. For example, Internet-enabled mobile handsets (e.g., a smartphone, an iPod®, etc.), video game consoles (e.g., Xbox®, PlayStation 3, etc.), tablet computers (e.g., an iPad®, a Motorola™ Xoom™, etc.), digital media players (e.g., a Roku® media player, a Slingbox®, a Tivo®, etc.), smart televisions, etc. may additionally or alternatively be used.

In the illustrated example of FIG. 1, the example media device 130 receives the monitoring instructions from the media provider 115. However, the example media device 130 may receive the monitoring instructions from any other party such as, for example, an app store. In some examples, the monitoring instructions are installed on the media device 130 by the user by downloading an application from an app store (e.g. Apple iTunes, Google play, etc.). The example media device 130 includes the monitoring instruction executor 135 to execute the monitoring instructions. In examples disclosed herein, the example monitoring instruction executor 135 is implemented as computer-readable instructions executing on a logic circuit such as a processor of the media device 130.

Media devices such as the media device 130 of FIG. 1 traditionally include a data store 140 (e.g., a memory) for storing media and/or application executables. The example data store 140 of the illustrated example of FIG. 1 may be any device for storing data such as, for example, flash memory, magnetic media, optical media, etc. In the illustrated example, the data store 140 is random access memory of the media device 130. In some examples, the data store 140 is implemented using HyperText Markup Language version 5 (HTML5) local storage. However, the example data store 140 may additionally or alternatively be implemented using, for example a cookie cache of a browser of the media device 130. Furthermore, the data stored in the data store 140 may be in any data format such as, for example, binary data, comma delimited data, tab delimited data, structured query language (SQL) structures, etc. While in the illustrated example the data store 140 is illustrated as a single database, the data store 140 may be implemented by multiple databases, and/or be stored in multiple memory locations of the media device. In the illustrated example of FIG. 1, the example data store 140 includes session memory 142 to store a session ID provided by the central facility 105. When reporting monitoring information to the central facility 105, the session ID is also reported to identify the media monitoring session to which the monitoring information corresponds.

Returning to the example central facility 105 of the illustrated example of FIG. 1, the example load balancer 150 of the illustrated example of FIG. 1 receives messages from the media device(s). In the illustrated example of FIG. 1, the example load balancer 150 uses a round-robin load balancing algorithm to distribute incoming messages to the servers 160, 170, 180 via the internal network 152. However, any other approach to load balancing may additionally or alternatively be used such as, for example, a weighted round robin distribution approach, a random distribution approach, a least-number-of-connections distribution approach, etc. In examples disclosed herein, the example load balancer 150 might send multiple messages received from a single media device 130 to multiple different servers 160, 170, 180.

The example internal network 152 of the illustrated example of FIG. 1 is a local area network (LAN). However, in some examples, other types of networks may additionally or alternatively be used such as, for example, a virtual private network (VPN), a wide area network (WAN), etc. In examples disclosed herein, the example internal network 152 is implemented as an Ethernet network. However, any other network type(s) and/or protocol(s) may additionally or alternatively be utilized to implement the example internal network 152 of FIG. 1.

The example server(s) 160, 170, 180 of the illustrated example of FIG. 1 receive messages from the load balancer 150. In examples disclosed herein, the example server(s) 160, 170, 180 are separate hardware computers. In some examples, the example server(s) 160, 170, 180 may be implemented on a same physical hardware computer via, for example, a virtual computing system, a virtual container, etc. In some examples, various combinations of hardware computers and/or virtual computers may be used. While three servers 160, 170, 180 are shown in the illustrated example of FIG. 1, any number of servers may additionally or alternatively be used such as, for example, two servers, ten servers, one hundred servers. An example implementation of the server 160 is disclosed in further detail in connection with FIG. 2. The other servers (e.g., the server 170, the server 180) are implemented in the same fashion as the server 160 of FIGS. 1 and/or 2.

In examples disclosed herein, each of the servers 160, 170, 180 includes a session database 165, 175, 185. The example session database(s) 165, 175, 185 may be any device for storing data such as, for example, flash memory, magnetic media, optical media, etc. The example session database(s) 165, 175, 185 of the illustrated example of FIG. 1 store session information and monitoring information received at the central facility 105 (e.g., from the media device 130). However, the example session database(s) 165, 175, 185 may additionally or alternatively store any other information. Furthermore, the data stored in the data store 430 may be in any data format such as, for example, binary data, comma delimited data, tab delimited data, structured query language (SQL) structures, etc. While in the illustrated example the session database(s) 165, 175, 185 are illustrated as single databases of each of the respective server(s) 160, 170, 180, the session database(s) 165, 175, 185 may be implemented by multiple databases, and/or be stored in multiple memory locations of the respective server(s) 160, 170, 180.

The example log aggregator 190 of the illustrated example of FIG. 1 collects monitoring information from each of the session database(s) 165, 175, 185 and aggregates the monitoring information. Because session information is stored in association with monitoring information in each of the session databases 165, 175, 185, the example log aggregator can aggregate monitoring information from multiple sources based on session information, even though the monitoring information is stored on separate session databases 165, 175, 185. The example log aggregator 190 provides the aggregated monitoring information to the report generator 195 for analysis and crediting.

The example report generator 195 of the illustrated example of FIG. 1 generates reports indicative of media exposure metrics and/or application usage metrics based on one or more different types of media device(s) (e.g., personal computers, portable devices, mobile phones, tablets, etc.). For example, the report generator 195 compiles media exposure metrics based on the aggregated monitoring information collected by the log aggregator 190. A report is then generated to indicate media exposure and/or application usage statistics. In some examples, the exposure measurements provide ratings information for different media (e.g., a particular television show, a particular website, a particular movie, etc.) In some examples, the exposure measurements indicate ratings information and/or usage statistics for different instrumented applications.

Additionally or alternatively, popularities of different types of media across different device types may be reported. Such different types of media may be, for example, news, movies, television programming, on-demand media, Internet-based media, games, streaming games, advertisements, etc. Such comparisons may be made across any type(s) and/or numbers of devices including, for example, cell phones, smart phones, dedicated portable multimedia playback devices, iPod® devices, tablet computing devices (e.g., an iPad®), standard-definition (SD) televisions, high-definition (HD) televisions, three-dimensional (3D) televisions, stationary computers, portable computers, Internet radios, etc. Any other type(s) and/or number of media and/or devices may be analyzed. The report may also associate the media exposure metrics with demographic segments (e.g., age groups, genders, ethnicities, etc.) corresponding to the user(s) of the media device(s). Additionally or alternatively, the report may associate the media exposure metrics with metric indicators of the popularity of the artist, genre, song, title, etc., across one or more user characteristics selected from one or more demographic segment(s), one or more age group(s), one or more gender(s), and/or any other user characteristic(s).

In some examples, the media exposure metrics are used to determine demographic reach of streaming media, ratings for streaming media, engagement indices for streaming media, user affinities associated with streaming media, broadcast media, and/or any other audience measure metric associated with streaming media and/or locally stored media. While in the illustrated example, the media exposure metrics are used to provide information for streaming media, the media exposure metrics may be used to provide information for any other type of media such as, for example, websites, non-streaming media, etc. In some examples, the media exposure metrics are audience share metrics indicative of percentages of audiences for different applications and/or types of applications that accessed the same media. For example, a first percentage of an audience may be exposed to news media via a browser application, while a second percentage of the audience may be exposed to the same news media via a news reader application.

Although for simplicity, the above discussion focuses on a single media device 130 executing monitoring instructions provided by a single media provider 115 to transmit monitoring information to a single central facility 105, any number of any of these elements may be present. For example, in a typical implementation, it is expected that multiple media providers will offer multiple different instrumented apps and/or websites including monitoring instructions to the public at large. Thus, it is expected that there will be many media devices accessing such apps and/or websites. Thus, it is expected that there will be many instances of the above processes conducted across many devices at the overlapping and/or distinct times. Thus, for example, there may be many instantiations of the machine-readable instructions disclosed in the below flowcharts operating at the same or different time. Some of these instances may be implemented as parallel threads operating on a same device.

Figure 2:
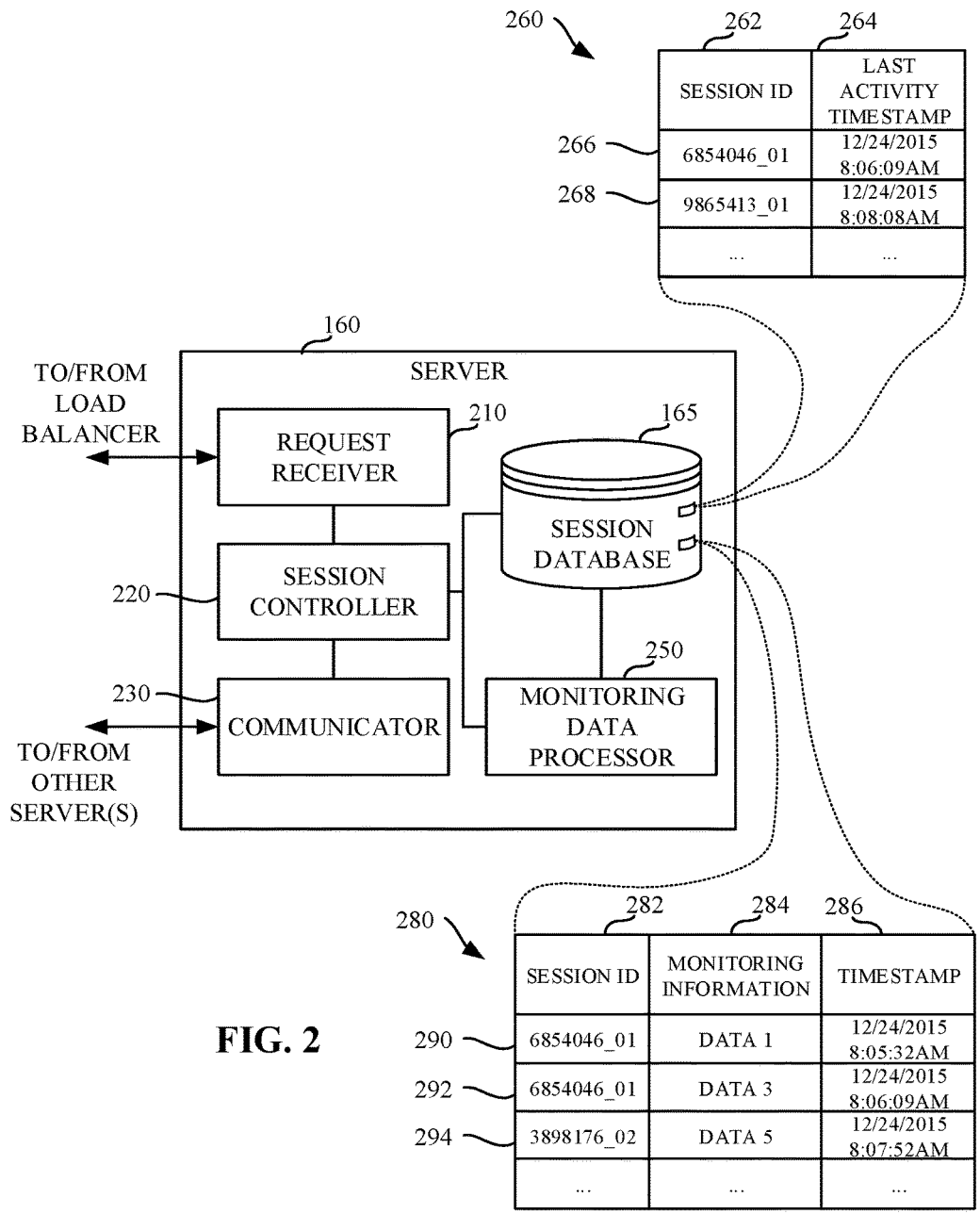
FIG. 2 depicts an example implementation of the example server of the example central facility of FIG. 1.

FIG. 2 depicts an example implementation of the example server 160 of the example central facility 105 of FIG. 1. The example server includes a request receiver 210, a session controller 220, a communicator 230, the example session database 165, and a monitoring data processor 250. The example session database 165 stores at least two example data tables, a session table 260 and a monitoring information table 280.

The example request receiver 210 of the illustrated example of FIG. 2 receives monitoring messages originating from the media device 130 and distributed by the load balancer 150. In examples disclosed herein, the monitoring messages are hypertext transfer protocol (HTTP) messages. However, any other past, present, or future protocol(s) and/or type(s) of messages may be used to convey the monitoring information such as, for example, HTTP Secure (HTTPS), file transfer protocol (FTP), short message service (SMS). In examples disclosed herein, the monitoring messages are HTTP messages using a post method. However, any other HTTP method may additionally or alternatively be used such as, for example, an HTTP get method, an HTTP put method, an HTTP delete method, etc. When using the HTTP post method, monitoring information is sent in a payload of the monitoring message. The example request receiver 210 inspects the received message to identify a requested action of the monitoring message. In some examples, the monitoring message requests a new session ID, the monitoring message transmits monitoring information in association with an existing session, the monitoring message requests deletion of a current session.

The example session controller 220 of the illustrated example of FIG. 2 inspects received monitoring information and session ID information to create, update, and/or delete session information in the session database 165. Upon determining that a new session should be created, the example session controller 220 generates a session ID. An example session ID is disclosed in connection with FIG. 3A.

Figure 3A:
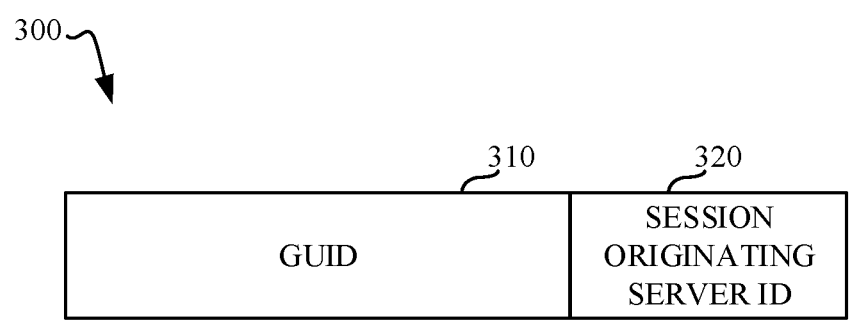
FIG. 3A depicts an example format of a session identifier generated by the server of FIGS. 1 and/or 2.

In the illustrated example of FIG. 3A, an example session ID 300 includes a globally unique identifier (GUID) 310 and a session originating server ID 320. The GUID 310 identifies the session being created. In some examples, the GUID is unique for the server generating the session ID 300. In some other examples, the GUID is unique across multiple servers (e.g., the server 160, the server 170, the server 180, etc.). In examples disclosed herein, the GUID is an alphanumeric string of characters. However, any other format may additionally or alternatively be used such as, for example, a hexadecimal string, a decimal number, etc. The example session originating server ID 320 uniquely identifies the server that generates the session ID 300. In examples disclosed herein, the session originating server ID 320 is appended to the GUID 310. However, the example session originating server ID 320 may be combined with the GUID 310 in any other fashion. In examples disclosed herein, the example session originating server ID 320 is a numeric identifier that identifies the originating server. However, any other approach to identifying the originating server may additionally or alternatively be used such as, for example, an Internet protocol (IP) address, a server name (e.g., a domain name system (DNS) name), etc.

In the illustrated example of FIG. 2, the example session database 165 stores a session table 260. The example session table 260 of FIG. 2 includes a session ID column 262 and a last activity timestamp column 264. The example session ID column 262 represents session IDs stored in the session database 165. The example last activity timestamp column 264 represents a timestamp corresponding to the last time that activity was detected in association with the respective session ID of the session ID column 262. The example session table 260 includes two example rows. A first example row 266 indicates that session ID "6854046_01" had a time of last activity at 8:06:09 AM on Dec. 24, 2015. A second example row 268 indicates that session ID "9865413_01" had a time of last activity at 8:08:08 AM on Dec. 24, 2015. Each of the session IDs corresponding to the first example row 266 and the second example row 268 end in "_01". The ending of "_01" corresponds to the session originating server ID 320 of FIG. 3A. As a result, in examples disclosed herein, both session IDs (e.g., the session ID of the first example row 266 and the session ID of the second example row 268) originated from the same server (e.g., the server 160). However, in some examples, the session ID stored in the session table 260 may omit the session originating server ID 320, as the session table 260 corresponds only to sessions originated by the server 160 that stores the session table 260. For example, a second session table will be stored in a second server (e.g., the server 170, the server 180) that will use a separate, unique session originating server ID.

Returning to the example session controller 220 of FIG. 2, in some examples, the example session controller 220 identifies that the received monitoring message indicates a session ID created by another server. The example session controller 220, via the example communicator 230, identifies and contacts the server that originated the session ID to determine a time of last activity for the session. If the time of last activity for the session is within a threshold amount of time of a time of receipt of the received monitoring information (e.g., within ten minutes of the last activity for the session), the example session controller instructs the session originating server to update the time of last activity for the session. If the time of last activity for the session is not within the threshold amount of time of the time of receipt of the received monitoring information, the session controller 220, via the request receiver 210, transmits a response to the media device requesting that the media device retransmit the monitoring information in a request for new session.

The example communicator 230 of the illustrated example of FIG. 2 communicates with other servers (e.g., the server 170, the server 180) of the central facility 105 via the internal network 152. In examples disclosed herein, the example communicator 230 implements an open database connectivity (ODBC) driver to connect to the session database(s) 175, 185 of the other server(s) 170, 180. However, any other approach to communicating with the other server(s) 170, 180 and/or the session database(s) 175, 185 of those other server(s) 170, 180 may additionally or alternatively be used. For example, a server message block (SMB) protocol may be used, HTTP may be used, etc.

The example monitoring data processor 250 of the illustrated example of FIG. 2 stores monitoring information received via the monitoring message received by the example request receiver 210 in the session database 165. In examples disclosed herein, the monitoring data processor 250 stores monitoring information in association with a session ID of the received in the monitoring message. In examples disclosed herein, the example monitoring data processor 250 stores the monitoring information in the monitoring information table 280. However, the monitoring information may be stored in any other location such as, for example, a database of the server 160 separate from the session database 165.

The example monitoring information table 280 includes a session ID column 282, a monitoring information column 284, and a timestamp column 286. The example session ID column 282 stores a session ID identified in the received monitoring message. The example monitoring information column 284 stores monitoring information included in the received monitoring message. In examples disclosed herein, the example monitoring information stored in the example monitoring information column 284 identifies media presented at or in the proximity of the media device 130. However, the example monitoring information stored in the example monitoring information column 284 may represent any other type(s) of information monitored by the example media device 130 such as, for example, user interaction data (e.g., keyboard presses, mouse clicks, window selections, etc.). The example timestamp column 286 identifies a time at which the message including the monitoring information was received. Identifying the time at which the monitoring information was received enables later identification of times at which media presentations identified by the monitoring information occurred.

In the illustrated example of FIG. 2, the example monitoring information table 280 includes a first row 290, a second row 292, and a third row 294. In the illustrated example of FIG. 2, the first row 290 and the second row 292 have a same session ID. In the illustrated example of FIG. 2, the session ID of the first example row 290 and the second example row 292 include an originating server ID of "01," indicating that the session originated from the server identified as "01." The third example row 294 includes a session ID that is different from the session ID of the first example row 290 and the second example row 292. Moreover, the third example session ID 294 includes an originating server ID of "02," indicating that the session originated from a server different from the server identified by the session originating server ID of the first example row 290 and the second example row 292 (e.g., "01").

Figure 3B:
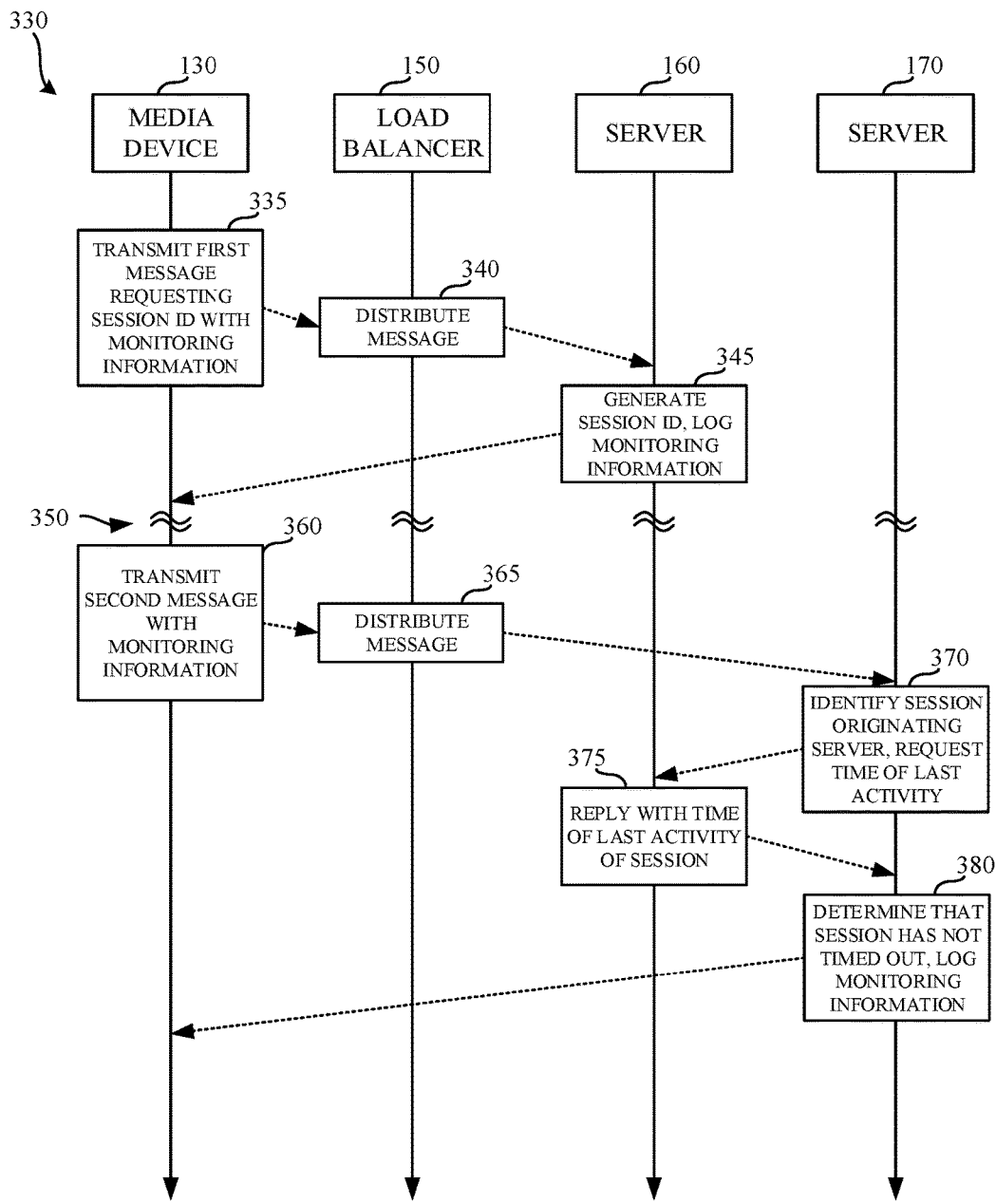
FIG. 3B depicts example communications that may occur between the media device, the load balancer, and the server(s) of FIG. 1.

FIG. 3B depicts an example communication diagram 330 illustrating communications that may occur between the media device 130, the load balancer 150, and the server(s) 160, 170 of FIG. 1. In the illustrated example of FIG. 3B, the communication diagram 330 begins when the media device 130 transmits a first message requesting a session ID. (Block 335). In the illustrated example of FIG. 3B, the first message includes monitoring information. However, in some examples, the first message may not include monitoring information and may instead be intended to request a session ID such that monitoring information can be transmitted in a subsequent message. The load balancer 150 receives the first message and determines a destination for the first message. (Block 340). As noted above, the load balancer 150 uses a round robin approach to distribute incoming messages to different servers 160, 170, 180. In the illustrated example of FIG. 3B, the load balancer 150 determines that the first message should be delivered to the first server 160. The first server 160 receives the first message and, in response, generates the requested session ID. (Block 345). The first server 160 stores a timestamp indicating a time of last activity in association with the session. In examples where the first message includes monitoring information, the example first server 160 logs the monitoring information in association with the session ID. In examples disclosed herein, the session ID includes the session originating server ID 320. The media device 130 is informed of the session ID such that subsequent messages can include the session ID, thereby enabling the monitoring information received from the media device 130 to be treated as having come from the same device during a single monitoring session.

In the illustrated example of FIG. 3B, some amount of time (e.g., seconds, minutes, hours, etc.) passes (350) until the media device 130 determines that additional monitoring information is ready to be sent. The media device transmits a second message including the monitoring information. (Block 360). The load balancer 150 receives the second message and determines a destination for the second message. (Block 365). In the illustrated example of FIG. 3B, the example load balancer 150 selects the second server 170 (e.g., a server different from the session originating server) to receive the second message. The second server 170 receives the second message and inspects the second message to identify the session originating server based on the session ID. (Block 370). In the illustrated example of FIG. 3B, the second server 170 identifies the first server 160 as the session originating server. The second server 170 contacts the first server 160 to request the time of last activity for the session. The first server 160 performs a lookup to identify the time of last activity for the session and replies to the second server 170 with the time of last activity for the session. (Block 375). The second server 170 determines an amount of time that has passed since the time of last activity of the session to determine whether a threshold amount of time has passed (e.g., five minutes, ten minutes, etc.). (Block 380). In the illustrated example of FIG. 3B, the second server determines that the threshold amount of time has not passed and logs the monitoring information in association with the session ID. The second server 170 acknowledges the receipt of the monitoring information to the media device 130. In some examples, the second server 170 instructs the first server 160 to update the time of last activity of the session.

In some examples, in lieu of block 380, the second server 170 might instead determine that the session has timed out. In such an example, the second server 170 instructs the media device 130 to re-transmit the monitoring information with a request for a new session ID.

While an example manner of implementing the media device 130 of FIG. 1 illustrated in FIG. 1, one or more of the elements, processes and/or devices illustrated in FIG. 1 may be combined, divided, re-arranged, omitted, eliminated and/or implemented in any other way. Further, the example monitoring instruction executor 135, the example data store 140, the example session memory 142, and/or more generally, the example media device 130 of FIG. 1 may be implemented by hardware, software, firmware and/or any combination of hardware, software and/or firmware. Thus, for example, any of the example monitoring instruction executor 135, the example data store 140, the example session memory 142, and/or more generally, the example media device 130 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example monitoring instruction executor 135, the example data store 140, the example session memory 142, and/or more generally, the example media device 130 of FIG. 1 is/are hereby expressly defined to include a tangible computer readable storage device or storage disk such as a memory, a digital versatile disk (DVD), a compact disk (CD), a Blu-ray disk, etc. storing the software and/or firmware. Further still, the example media device 130 of FIG. 1 may include one or more elements, processes and/or devices in addition to, or instead of, those illustrated in FIG. 1, and/or may include more than one of any or all of the illustrated elements, processes and devices.

While an example manner of implementing the example server 160 of FIG. 1 is illustrated in FIG. 2 and the example central facility 105 of FIG. 1 is illustrated in FIG. 1, one or more of the elements, processes and/or devices illustrated in FIGS. 1 and/or 2 may be combined, divided, re-arranged, omitted, eliminated and/or implemented in any other way. Further, the example monitoring instruction provider 110, the example load balancer 150, the example internal network 152, the example request receiver 210, the example session controller 220, the example communicator 230, the example monitoring data processor 250, the example session database 165, and/or, more generally, the example server 160 of FIGS. 1 and/or 2, the example log aggregator 190, the example report generator 195, and/or, more generally, the example central facility 105 of FIG. 1 may be implemented by hardware, software, firmware and/or any combination of hardware, software and/or firmware. Thus, for example, any of the example monitoring instruction provider 110, the example load balancer 150, the example internal network 152, the example request receiver 210, the example session controller 220, the example communicator 230, the example monitoring data processor 250, the example session database 165, and/or, more generally, the example server 160 of FIGS. 1 and/or 2, the example log aggregator 190, the example report generator 195, and/or, more generally, the example central facility 105 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example monitoring instruction provider 110, the example load balancer 150, the example internal network 152, the example request receiver 210, the example session controller 220, the example communicator 230, the example monitoring data processor 250, the example session database 165, and/or, more generally, the example server 160 of FIGS. 1 and/or 2, the example log aggregator 190, the example report generator 195, and/or, more generally, the example central facility 105 of FIG. 1 is/are hereby expressly defined to include a tangible computer readable storage device or storage disk such as a memory, a digital versatile disk (DVD), a compact disk (CD), a Blu-ray disk, etc. storing the software and/or firmware. Further still, the example central facility 105 of FIG. 1 may include one or more elements, processes and/or devices in addition to, or instead of, those illustrated in FIGS. 1 and/or 2, and/or may include more than one of any or all of the illustrated elements, processes and devices.

Figure 4:
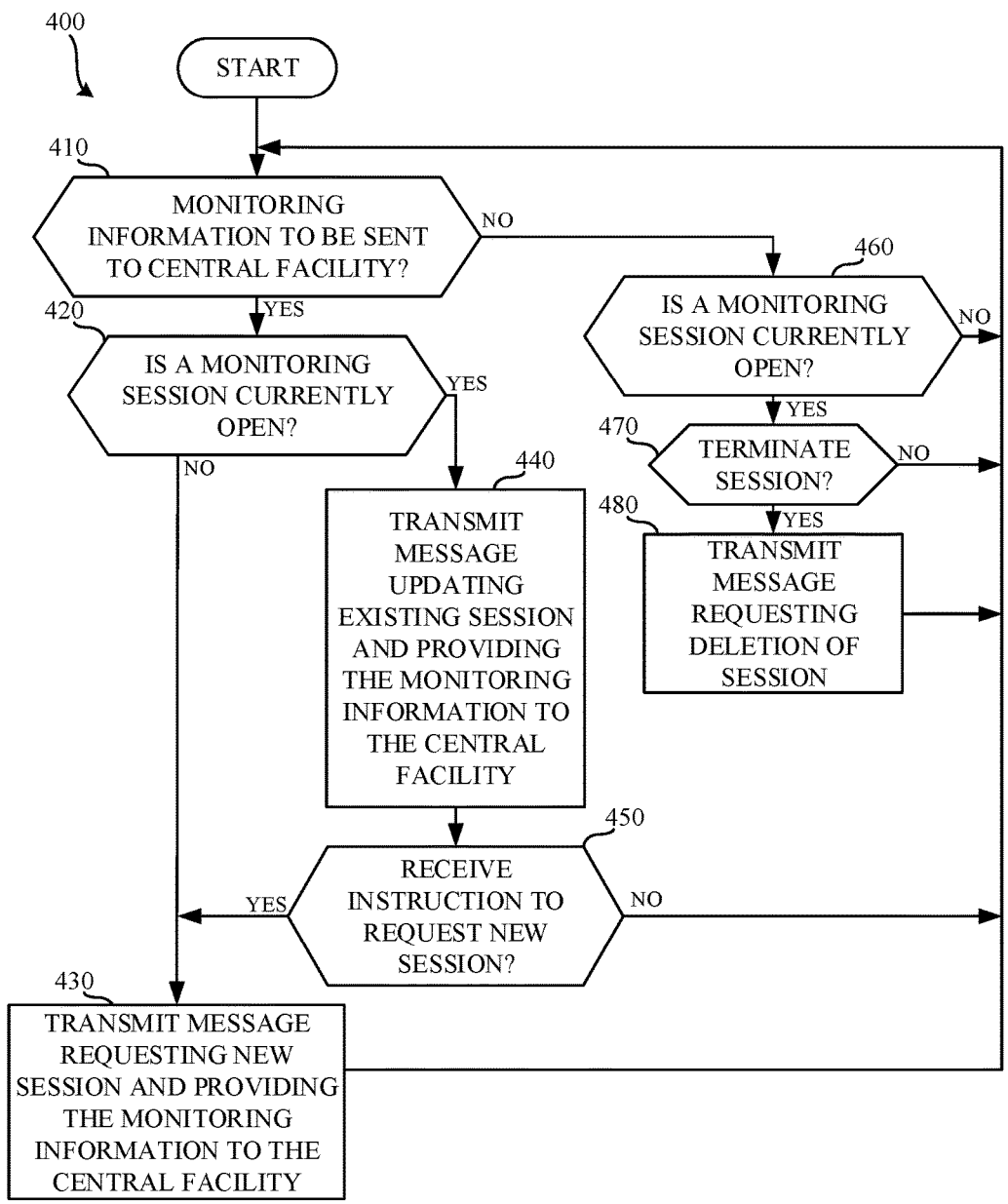
FIG. 4 is a flowchart representative of example machine readable instructions that may be executed to implement the example media device of FIG. 1.
Figure 5:
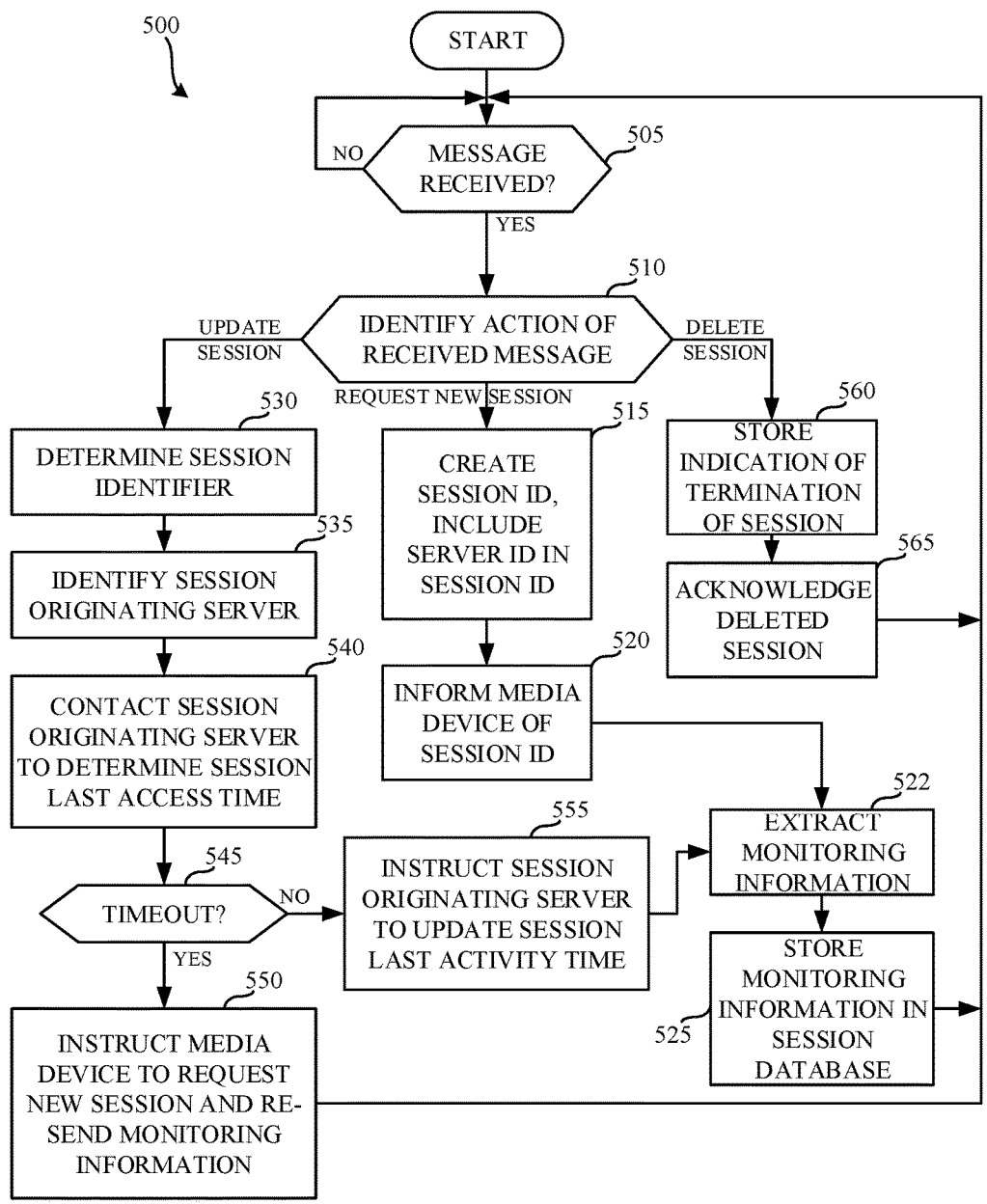
FIG. 5 is a flowchart representative of example machine readable instructions that may be executed to implement the example server of FIGS. 1 and/or 2 to coordinate receipt of monitoring information from the media device of FIG. 1.

A flowchart representative of example machine readable instructions for implementing the example media device 130 of FIG. 1 is shown in FIG. 4. Flowchart(s) representative of example machine readable instructions for implementing the example central facility 105 of FIG. 1 is shown in FIGS. 5 and/or 6. In these example, the machine readable instructions comprise a program(s) for execution by a processor such as the processor 712 and/or the processor 812 shown in the example processor platform 700 discussed below in connection with FIG. 7, or the example processor platform 800 discussed below in connection with FIG. 8, respectively. The program(s) may be embodied in software stored on a tangible computer readable storage medium such as a CD-ROM, a floppy disk, a hard drive, a digital versatile disk (DVD), a Blu-ray disk, or a memory associated with the processor 712 and/or the processor 812, but the entire program and/or parts thereof could alternatively be executed by a device other than the processor 712 and/or the processor 812 and/or embodied in firmware or dedicated hardware. Further, although the example program is described with reference to the flowchart illustrated in FIGS. 4, 5, and/or 6, many other methods of implementing the example media device 130 and/or the example central facility 105 may alternatively be used. For example, the order of execution of the blocks may be changed, and/or some of the blocks described may be changed, eliminated, or combined.

As mentioned above, the example processes of FIGS. 4, 5, and/or 6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 4, 5, and/or 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

FIG. 4 is a flowchart representative of example machine readable instructions that may be executed to implement the example media device 130 of FIG. 1. The example process 400 of the illustrated example of FIG. 4 begins when the example monitoring instruction executor 135 determines whether there is monitoring information to be sent to the central facility 105. (Block 410). In the illustrated example, the determination of whether there is monitoring information to be sent is implemented by detecting a media presentation from and/or in the proximity of the media device 130. However, in some examples, the detection of the monitoring information may be implemented by detecting user interaction with the media device 130. In the illustrated example of FIG. 4, the determination of whether there is monitoring information to be sent to the central facility 105 is performed in response to detection of the media presentation. However, in some examples, monitoring information may first be cached, and a determination may be made as to whether a threshold amount of information exists to be sent (e.g., send monitoring information when it is determined that there is one hundred kilobytes of monitoring information to be sent) and/or whether the information has reached a threshold age (e.g., do not delay longer than one hour when caching data monitoring information to be sent.)

If monitoring information is to be sent to the central facility 105 (Block 410 returns a result of YES), the example monitoring instruction executor 135 determines whether a monitoring session is currently open with the central facility 105. (Block 420). In examples disclosed herein, whether the monitoring session is currently open with the central facility 105 is determined by inspecting the session memory 142 to determine whether a session ID is present. However, in some examples, the example monitoring instruction executor 135 compares a time of last activity of the identified session ID (e.g., a time that a last message was transmitted to the central facility 105) to determine whether a threshold amount of time has passed (e.g., five minutes, thirty minutes, etc.). If the monitoring session is not currently open (Block 420 returns a result of NO), the example monitoring instruction executor 135 transmits a message requesting a new session ID and providing the monitoring information to the central facility 105. (Block 430). Control then proceeds to block 410, where the process is repeated.

If a monitoring session is open (Block 420 returns a result of YES,) the example monitoring instruction executor 135 transmits a message updating the existing session and providing the monitoring information to the central facility 105. (Block 440). In response to the message updating the existing session, the central facility 105 may transmit an instruction to request a new session. The example monitoring instruction executor 135 determines whether the instruction to request the new session has been received. (Block 450). If the request has been received (Block 450 returns a result of YES), the example monitoring instruction executor 135 transmits a message requesting a new session and providing the monitoring information to the central facility 105. (Block 430). In examples disclosed herein, the monitoring information is re-transmitted (e.g., the monitoring information is first transmitted in block 440 and then re-transmitted in block 430). However, in some examples, the monitoring information may not be re-transmitted. In some examples, instead of instructing the example monitoring instruction executor 135 to re-transmit monitoring information, the example central facility 105 may create a new session ID to be used and instruct the example monitoring instruction executor 135 to use that new session ID in subsequent communications. Returning to block 450, if no instruction to request a new session is received, control proceeds to block 410, where the process is repeated.

Returning to block 410, in some examples, there may be no monitoring information to be transmitted to the central facility 105. In the illustrated example of FIG. 4, the example monitoring instruction executor 135 determines that no monitoring information is to be transmitted by determining whether media is currently being presented by and/or within proximity of the media device 130. However, any other approach to determining whether monitoring information exists to be sent may additionally or alternatively be used such as, for example, inspecting a cache (e.g.

the data store 140) to determine whether any monitoring information has been cached for transmission to the central facility 105. Moreover, in some examples, the example monitoring instruction executor 135 may determine that that no monitoring information is to be sent by determining that the user has closed an application (e.g., a browser, an "app") on the mobile device 130, etc.

If the example monitoring instruction executor 135 determines that no monitoring information is to be sent to the central facility (Block 410 returns a result of NO), the example monitoring instruction executor 135 determines whether a monitoring session is currently open. (Block 460). In examples disclosed herein, whether the monitoring session is currently open with the central facility 105 is determined by inspecting the session memory 142 to determine whether a session ID is present. However, in some examples, the example monitoring instruction executor 135 compares a time of last activity of the identified session ID (e.g., a time that a last message was transmitted to the central facility 105) to determine whether a threshold amount of time has passed (e.g., five minutes, thirty minutes, etc.). If the monitoring session is not currently open (Block 460 returns a result of NO), control returns to block 410, where the example monitoring instruction executor 135 waits for monitoring information to send to the central facility 105.

If a monitoring session is open (Block 460 returns a result of YES), the example monitoring instruction executor 135 determines whether the monitoring session should be terminated. (Block 470). In examples disclosed herein, the example monitoring instruction executor 135 determines whether the monitoring session should be terminated based on a threshold amount of time having passed since a last user interaction with the media device 130. However, any other approach to determining whether the session should be terminated may additionally or alternatively be used such as, for example, determining whether an application (e.g., a browser, an "app") has been closed on the media device 130. If the session is not to be terminated (Block 470 returns a result of NO), control returns to block 410, where the example monitoring instruction executor 135 waits for monitoring information to send to the central facility 105. If the session is to be terminated (Block 470 returns a result of YES), the example monitoring instruction executor 135 transmits a message requesting deletion of the session. (Block 480). Transmitting the message requesting deletion of the session is useful because it enables the central facility 105 to record a time at which the session was positively terminated (e.g., an app was closed), instead of waiting for a session to time out (e.g., an assumption that the session should be terminated). Control then proceeds to block 410, where the process of FIG. 4 is repeated.

FIG. 5 is a flowchart representative of example machine readable instructions 500 that may be executed to implement the example server 160 of FIGS. 1 and/or 2 to coordinate receipt of monitoring information from the media device 130 of FIG. 1. The example process 500 of FIG. 5 begins when the example request receiver 210 determines that a monitoring message has been received. (Block 505). In examples disclosed herein, the example monitoring message originates from the media device 130, and is routed to the request receiver 210 by the load balancer 150. However, the example monitoring message may be received in any other fashion. If the example request receiver 210 identifies that no message has been received (Block 505 returns a result of NO), the example request receiver 210 continues to monitor for the monitoring message. (Block 505).

Upon receipt of the message (Block 505 returns a result of YES), the example request receiver 210 inspects the received message to identify an action to be performed in response to the message. (Block 510). The media device 130 may request a new session (see Block 430 of FIG. 4). If the example request receiver 210 identifies that the monitoring message requests a new session ID (Block 510 returns a result of REQUEST NEW SESSION), the example session controller 220 creates a session ID for the media device 130. (Block 515). In examples disclosed herein, the example session controller 220 creates a session ID including an identifier of the server 160 in the session ID (e.g., the session originating server ID 320 of FIG. 3A). In examples disclosed herein, the session controller 220 stores the session ID and a time of receipt of the monitoring message in the session table 260 of the session database 165. Storing the time of receipt of the monitoring message enables later determinations of whether a threshold amount of time has passed since a previous monitoring message. The session controller 220 transmits a response via the request receiver 210 to inform the media device of the session ID. (Block 520). In some examples, the session ID is communicated to the media device 130 via an instruction to store a cookie. However, any other approach to informing the media device 130 of the session ID may additionally or alternatively be used.

The example monitoring data processor 250 extracts monitoring information from the received message. (Block 522). In some examples, the monitoring information is included as a payload of the message. In such an example, the example monitoring data processor 250 extracts the payload of the message. However, in some examples, the monitoring information is additionally included in a header of the message. In such an example, the monitoring data processor 250 inspects the header to extract the monitoring information. The example monitoring data processor 250 stores the monitoring information received via the request in the session database 165. (Block 525). In examples disclosed herein, the monitoring information is stored in the monitoring information table 280 of FIG. 2. In the illustrated example of FIG. 5, the monitoring data processor 250 stores the session ID generated by the session controller 220 in block 515, and also stores a timestamp indicating a time of receipt of the monitoring information. Control then proceeds to block 505, where the request receiver 210 waits for a subsequent monitoring message.

Returning to block 510, in some examples, the monitoring message may include a session ID that had previously been generated. For example, the session controller 220 of the server 160 may have generated the session ID in block 515 of FIG. 5. Alternatively, a session controller of a server other than the server 160 (e.g., the server 170, the server 180) may have created the session. Because of the load balancer 150 distributing monitoring messages, some monitoring messages might not be routed to the server that originated the session. In some examples, the example request receiver 210 identifies that a session is to be updated with received monitoring information by detecting the presence of a session ID in the monitoring message. In some other examples, the example request receiver 210 identifies that the session is to be updated based on a separate instruction included in the received monitoring message. Upon determining that the session should be updated (e.g., block 510 returns a result of UPDATE SESSION), the example session controller 220 inspects the monitoring message to determine the session ID. (Block 530). The example session controller 220 identifies the session originating server based on the session identifier. (Block 535). In examples disclosed herein, the example session controller 220 identifies the session originating server by parsing the session ID. For example, a server ID of "01" can be identified from the session ID of "6854046_01." In some examples, regular expressions are used to extract the session originating server ID from the session ID.

Using the session originating server ID, the session controller 220 communicates with the session originating server via the communicator 230. (Block 540). In the illustrated example of FIG. 5, the session ID is transmitted to the session originating server as part of a request for the time of last activity of the session ID. In response, the session originating server responds with the time of last activity for the session. In some examples, the server receiving the monitoring message may be the session originating server and a loopback address may be used to request the time of last activity of the session ID. In some other examples, the session controller 220 may first determine whether communicating with another server is necessary to identify the time of last activity.

The session controller 220 inspects the time of last activity of the session ID to determine whether there has been a timeout. (Block 545). A timeout is detected when a difference between the time of last activity of the session ID and a time of receipt of the monitoring message is greater than a threshold duration (e.g., five minutes, ten minutes, thirty minutes, etc.). If a timeout is detected (e.g., the difference exceeds the threshold resulting in block 545 returning a result of YES), the example session controller 220, via the request receiver 210, instructs the media device to request a new session and re-transmit the monitoring information. (Block 550). Control then proceeds to block 505, where the request receiver 210 awaits a subsequent monitoring message. However, in some examples, instead of requesting re-transmission of the monitoring information (Block 550), control may proceed to block 515, where a new session is initialized (Block 515), the media device is informed of the new session (Block 520), and the monitoring information is stored (Block 525).

Returning to block 545, if no timeout is detected (e.g., the difference does not exceed the threshold resulting in block 545 returning a result of NO), the session controller 220, via the communicator 230 transmits a message instructing the session originating server to update the time of last activity to the time at which the monitoring message was received. (Block 555). Updating the time of last activity ensures that sessions are kept alive as long as they are being used. The example monitoring data processor 250 extracts monitoring information from the received message. (Block 522). The example session controller 220 stores the extracted monitoring information in the session database 165. (Block 525). In examples disclosed herein, the monitoring information is stored in the monitoring information table 280 of FIG. 2. In the illustrated example of FIG. 5, the monitoring data processor 250 stores the session ID generated by the session controller 220 in block 515, and also stores a timestamp indicating a time of receipt of the monitoring information. Control then proceeds to block 505, where the request receiver 210 waits for a subsequent monitoring message.

Returning to block 510, in some examples, the media device 130 may identify that the session should be terminated (see blocks 470 and 480 of FIG. 4). For example, the media device 130 may determine that the session should be terminated upon detecting that an application (e.g., a browser, an "app") has been closed on the media device 130. Upon determining that the session should be deleted (e.g., block 510 returns a result of DELETE SESSION), the example monitoring data processor 250 stores an indication of the termination of the session. (Block 560). In examples disclosed herein, the record indicating the termination of the session is stored in the monitoring information table 280. Storing the record indicating the termination of the session ensures proper crediting of, for example, how long a user was actively using the media device 130. In some examples, in addition to storing the indication of the termination of the session in the monitoring information table 280, the example session controller 220 removes the session ID and last activity timestamp corresponding to the deleted session from the session table 260. The example session controller 220 then acknowledges the deletion of the session via the request receiver 210 to the media device 130. (Block 565). Control then proceeds to block 505, where the request receiver 210 waits for a subsequent monitoring message.

Figure 6:
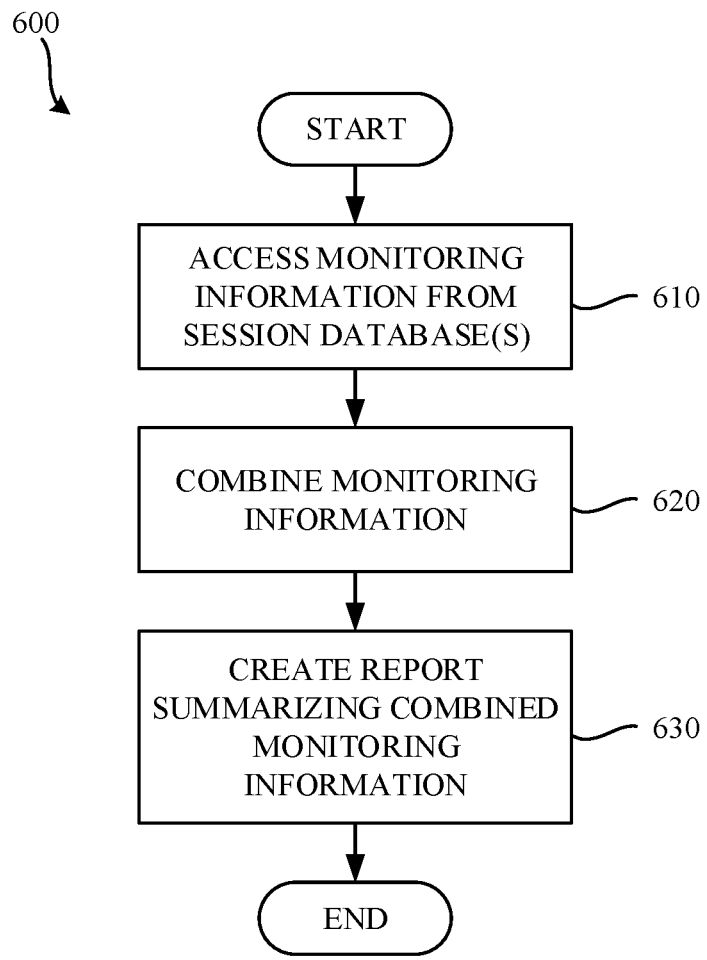
FIG. 6 is a flowchart representative of example machine readable instructions that may be executed to implement the example central facility of FIG. 1 to aggregate monitoring information collected by the server(s) of FIG. 1.

FIG. 6 is a flowchart representative of example machine readable instructions 600 that may be executed to implement the example central facility 105 of FIG. 1 to aggregate monitoring information collected by the server(s) of FIG. 1. The example process 610 of FIG. 6 begins when the example log aggregator 190 accesses monitoring information from the session database(s) 165, 175, 185. (Block 610). In the illustrated example of FIG. 6, the monitoring information is accessed from each of the monitoring information tables 280 of the respective session databases 165, 175, 185. However, in some examples, monitoring information may be accessed from a subset of the session databases 165, 175, 185. In examples disclosed herein, the monitoring information is accessed periodically (e.g., once a day, every hour, etc.) to ensure that reports summarizing the monitoring information are up to date. However, in some examples, the monitoring information is accessed a-periodically (e.g., upon receipt of a request for a report, when a threshold amount of data stored in the session database(s) 165, 175, 185 is detected, etc.).

The example log aggregator 190 combines the monitoring information accessed from each of the session databases 165, 175, 185. (Block 620). Combining the monitoring information ensures that monitoring information corresponding to a single session that might have been received at multiple different servers 160, 170, 180 are aggregated to a common location. The example report generator then generates a report summarizing the combined monitoring information. (Block 630). In examples disclosed herein, the report summarizes media exposure information. However, any other type(s) of report(s) may additionally or alternatively be generated. For example, popularities of different types of media across different device types may be reported. Such different types of media may be, for example, news, movies, television programming, on-demand media, Internet-based media, games, streaming games, advertisements, etc. Such comparisons may be made across any type(s) and/or numbers of devices including, for example, cell phones, smart phones, dedicated portable multimedia playback devices, iPod® devices, tablet computing devices (e.g., an iPad®), standard-definition (SD) televisions, high-definition (HD) televisions, three-dimensional (3D) televisions, stationary computers, portable computers, Internet radios, etc. Any other type(s) and/or number of media and/or devices may be analyzed. The report may also associate the media exposure metrics with demographic segments (e.g., age groups, genders, ethnicities, etc.) corresponding to the user(s) of the media device(s). Additionally or alternatively, the report may associate the media exposure metrics with indicators of the popularity of the artist, genre, song, title, etc., across one or more user characteristics selected from one or more demographic segment(s), one or more age group(s), one or more gender(s), and/or any other user characteristic(s).

Figure 7:
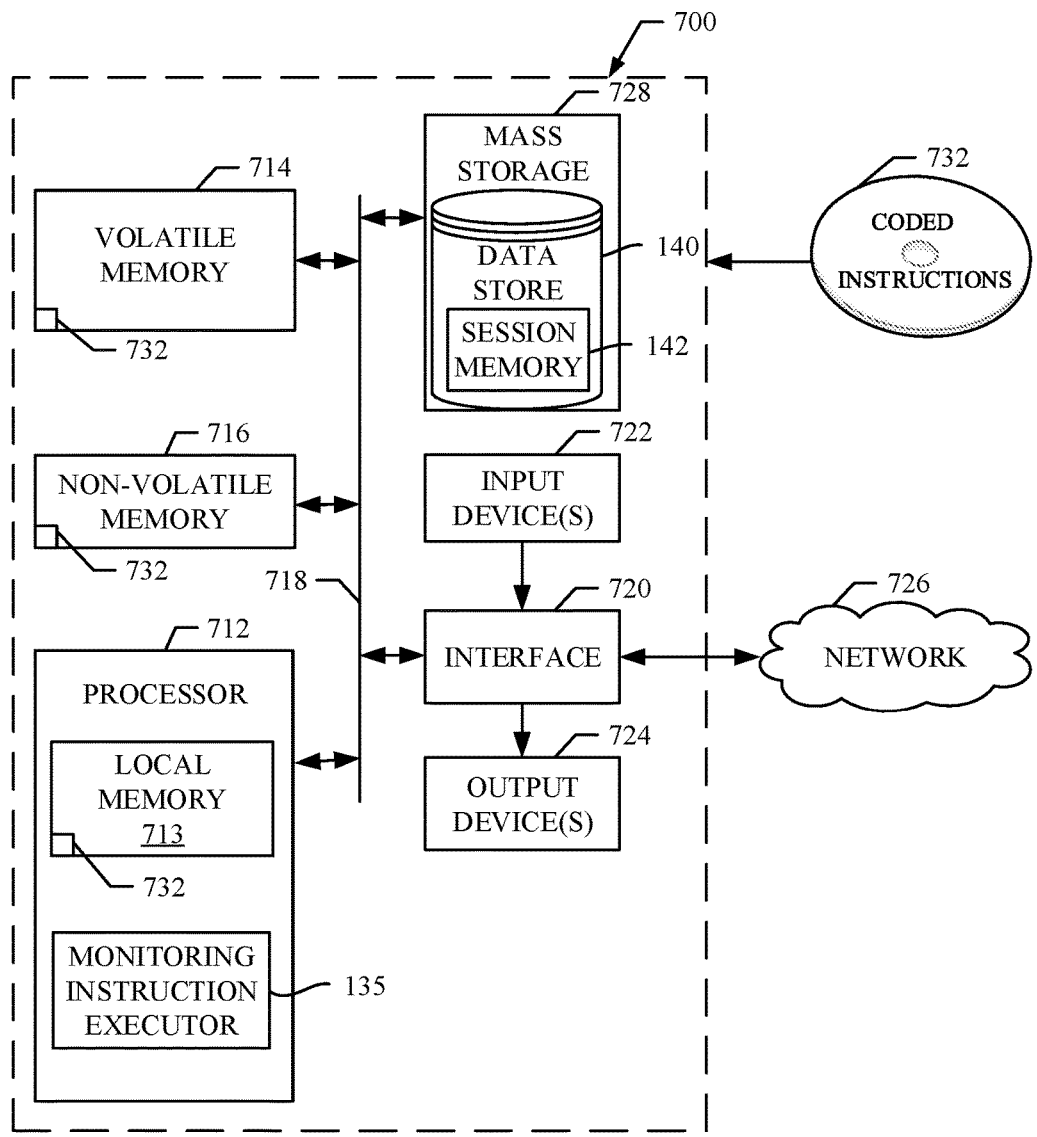
FIG. 7 is a block diagram of an example processor platform structured to execute the example machine readable instructions of FIG. 4 to implement the example media device of FIG. 1.

FIG. 7 is a block diagram of an example processor platform 1000 capable of executing the instructions of FIG. 4 to implement the example media device 130 of FIG. 1. The processor platform 700 can be, for example, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer.

The example processor 712 of the illustrated example of FIG. 7 may implement the example monitoring instruction executor 135. The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. The example mass storage device 728 may implement the example data store 140 and/or the example session memory 142. Examples of such mass storage devices 728 include floppy disk drives, hard drive disks, compact disk drives, Blu-ray disk drives, RAID systems, and digital versatile disk (DVD) drives.

The coded instructions 732 of FIG. 4 may be stored in the mass storage device 728, in the volatile memory 714, in the non-volatile memory 716, and/or on a removable tangible computer readable storage medium such as a CD or DVD.

Figure 8:
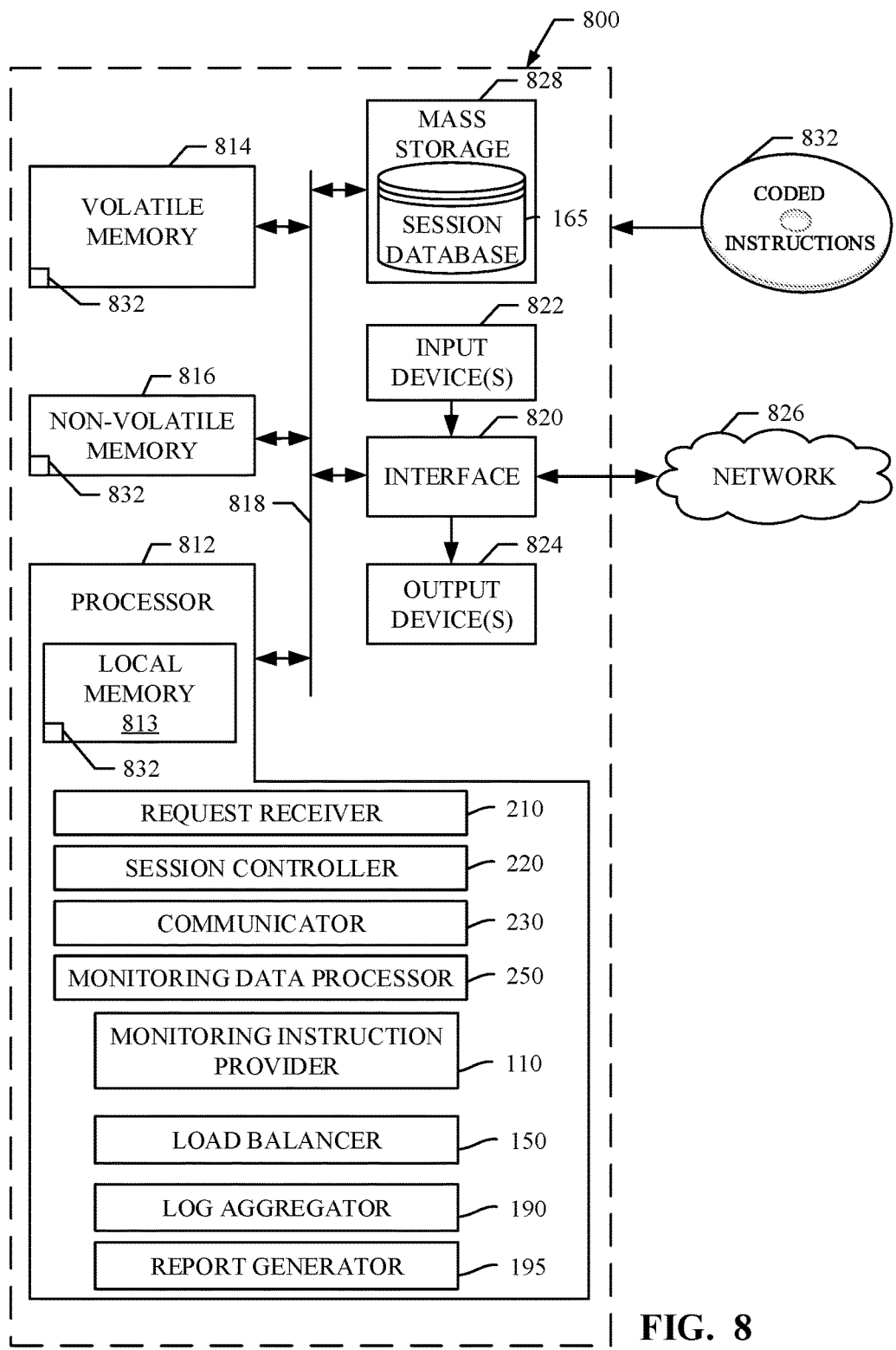
FIG. 8 is a block diagram of an example processor platform structured to execute the example machine readable instructions of FIGS. 5 and/or 6 to implement the example central facility of FIG. 1.

FIG. 8 is a block diagram of an example processor platform 800 capable of executing the instructions of FIGS. 5 and/or 6 to implement the central facility 105 of FIG. 1. The processor platform 800 can be, for example, a server, a personal computer, an Internet appliance, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer.

The example processor 812 of the illustrated example of FIG. 8 may implement the example request receiver 210, the example session controller 220, the example communicator 230, the example monitoring data processor 250, the example monitoring instruction provider 110, the example load balancer 150, the example log aggregator 190, and/or the example report generator 195. The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, a keyboard, a button, a mouse, a touchscreen, etc.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. The example mass storage devices 828 may implement the example session database 165. Examples of such mass storage devices 828 include floppy disk drives, hard drive disks, compact disk drives, Blu-ray disk drives, RAID systems, and digital versatile disk (DVD) drives.

The coded instructions 832 of FIGS. 5 and/or 6 may be stored in the mass storage device 828, in the volatile memory 814, in the non-volatile memory 816, and/or on a removable tangible computer readable storage medium such as a CD or DVD.

From the foregoing, it will be appreciated that the above disclosed methods, apparatus and articles of manufacture enable coordination of receipt of monitoring information from client devices. As a result of using a server ID included in a session ID used by a client device when reporting monitoring information, multiple receiving servers can be used. Using multiple receiving servers enables scaling for large amounts of client devices (e.g., one hundred thousand client devices, one million client devices, ten million client devices) reporting monitoring information simultaneously. Moreover, in the event of a failure of a single server, monitoring information is still collected, as the load balancer 150 of FIG. 1 will not direct incoming monitoring messages to a failed server. As a result, less incoming monitoring information is missed, resulting in better integrity of the collected monitoring information.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to coordinate receipt of monitoring information, the method comprising:
    in response to a first received message requesting a session identifier, creating, with a first processing device, the session identifier including an identifier of the first processing device, the first message received from a media device via a load balancer;
    extracting, with the first processing device, first monitoring information from the first message;
    storing, with the first processing device, the first monitoring information in a first database of the first processing device;
    extracting, with a second processing device, the identifier of the first processing device from a second message received from the media device via the load balancer;
    transmitting, from the second processing device to the first processing device, a request for a time of last activity stored in the first database of the first processing device in association with the session identifier; and
    in response to a determination that the time of last activity is within a threshold period of time of receipt of the second message:
        storing second monitoring information extracted from the second message in a second database of the second processing device, the second database different from the first database; and
        transmitting, from the second processing device to the first processing device and based on the identifier of the first processing device included in the session identifier, an instruction to update the time of last activity stored in the first database.

2. The method of claim 1, further including, in response to a determination that the time of last activity is not within the threshold period of time of the receipt of the second message, transmitting a monitoring instruction to the media device, the monitoring instruction to cause the media device to transmit a request for a new session identifier.

3. The method of claim 2, wherein the monitoring instruction is further to cause the media device to re-transmit the second monitoring information transmitted in the second message.

4. The method of claim 1, further including aggregating the first monitoring information stored in the first database of the first processing device and the second monitoring information stored in the second database of the second processing device to create aggregated monitoring information.

5. The method of claim 4, further including preparing a report summarizing the aggregated monitoring information.

6. The method of claim 1, wherein the first processing device is different from the second processing device.

7. The method of claim 1, further including providing, with the first processing device, the session identifier to the media device.

8. One or more tangible machine-readable storage disks or storage devices comprising instructions which, when executed, cause a central facility to at least:
    in response to a first received message requesting a session identifier, create the session identifier, the session identifier including an identifier of a first server, the first message received at the first server from a media device via a load balancer;
    extract first monitoring information from the first message;
    store the first monitoring information in a first database of the first server;
    extract the identifier of the first server from a second message received at a second server from the media device via the load balancer;
    transmit, from the second server to the first server, a request for a time of last activity stored in the first database of the first server in association with the session identifier; and
    in response to a determination that the time of last activity is within a threshold period of time of receipt of the second message:
        store second monitoring information extracted from the second message in a second database of the second server, the second database different from the first database; and
        transmit, from the second processing device to the first processing device and based on the identifier of the first processing device included in the session identifier, an instruction to update the time of last activity stored in the first database.

9. The one or more tangible machine-readable storage disks or storage devices of claim 8, wherein the instructions, when executed, cause the central facility to, in response to a determination that the time of last activity is not within the threshold period of time of the receipt of the second message, transmit a monitoring instruction to the media device, the monitoring instruction to cause the media device to transmit a request for a new session identifier.

10. The one or more tangible machine-readable storage disks or storage devices of claim 9, wherein the monitoring instruction is further to cause the media device to re-transmit the second monitoring information transmitted in the second message.

11. The one or more tangible machine-readable storage disks or storage devices of claim 8, wherein the instructions, when executed, cause the central facility to aggregate the first monitoring information stored in the first database and the second monitoring information stored in the second database to create aggregated monitoring information.

12. The one or more tangible machine-readable storage disks or storage devices of claim 11, wherein the instructions, when executed, cause the central facility to prepare a report summarizing the aggregated monitoring information.

13. A system to coordinate receipt of monitoring information, the system comprising:
  a load balancer;
  a first processing device including:
    a first session controller to, in response to a first received message received via the load balancer, create a session identifier, the session identifier including an identifier of the first session controller, the first message received from a media device via the load balancer, the first session controller to extract first monitoring information from the first message;
    a first database; and
    a first monitoring data processor to store the first monitoring information in the first database; and
  a second processing device different from the first processing device, the second processing device including:
    a second session controller to, in response to a second received message received via the load balancer, extract the identifier of the first session controller from the session identifier of the second received message;
    a communicator to request a time of last activity corresponding to the session identifier extracted from the second received message received from the first session controller;
    a second database different from the first database; and
    a second monitoring data processor to, in response to a determination that the time of last activity is within a threshold period of time of receipt of the second message:
      store second monitoring information extracted from the second message in the second database; and
      transmit, to the first monitoring data processor based on the identifier of the first monitoring data processor included in the session identifier, an instruction to update the time of last activity stored in the first database, wherein the load balancer, the first session controller, the first monitoring data processor, the second session controller, or the second monitoring data processor are implemented by a hardware processor.

14. The system of claim 13, wherein the second session controller is to, in response to a determination that the time of last activity is not within the threshold period of time of the receipt of the second message, transmit a monitoring instruction to a media device, the monitoring instruction to cause the media device to transmit a request for a new session identifier.

15. The system of claim 13, further including an aggregator to aggregate the first monitoring information stored in the first database of the first processing device and the second monitoring information stored in the second database of the second processing device to create aggregated monitoring information.

* * * * *